United States Patent
Fong et al.

(10) Patent No.: US 11,243,783 B2
(45) Date of Patent: Feb. 8, 2022

(54) DEVICE RE-CONFIGURATION FOR SECURITY

(71) Applicant: PPIP LLC, Tempe, AZ (US)

(72) Inventors: Michael Fong, Tempe, AZ (US); Neric Hsin-wu Fong, Tempe, AZ (US); Ryan Mark Speers, Silver Spring, MD (US); Mohamad Ahmad Foustok, Parkland, FL (US)

(73) Assignee: PPIP, LLC, Chandler, AZ (US)

( * ) Notice: Subject to any disclaimer, the term of this patent is extended or adjusted under 35 U.S.C. 154(b) by 253 days.

(21) Appl. No.: 16/526,460

(22) Filed: Jul. 30, 2019

(65) Prior Publication Data

US 2021/0034381 A1 Feb. 4, 2021

(51) Int. Cl.
*G06F 9/44* (2018.01)
*G06F 13/10* (2006.01)
*G06F 21/57* (2013.01)
*G06F 9/445* (2018.01)
*G06F 1/18* (2006.01)

(52) U.S. Cl.
CPC .......... *G06F 9/44505* (2013.01); *G06F 1/182* (2013.01); *G06F 13/102* (2013.01); *G06F 21/572* (2013.01); *G06F 21/577* (2013.01); *G06F 2221/033* (2013.01); *G06F 2221/034* (2013.01)

(58) Field of Classification Search
CPC .. G06F 9/44505; G06F 21/577; G06F 13/102; G06F 21/572; G06F 1/182; G06F 2221/033; G06F 2221/034; G06F 9/441; G06F 8/654; G06F 1/1626; G06F 1/1632
USPC .................................................. 713/1, 2, 100
See application file for complete search history.

(56) References Cited

U.S. PATENT DOCUMENTS

| | | | |
|---|---|---|---|
| 9,430,648 B2 * | 8/2016 | Jang | H04W 4/80 |
| 2018/0260209 A1 * | 9/2018 | Dooley | H04B 5/0031 |
| 2019/0392156 A1 * | 12/2019 | Garlati | H04L 9/3247 |

* cited by examiner

*Primary Examiner* — Michael J Brown
(74) *Attorney, Agent, or Firm* — Fernando & Partners, LLP

(57) ABSTRACT

In accordance with some embodiments, an apparatus that controls device re-configuration for security is provided. The apparatus includes a storage storing a first firmware image for a re-configurable data communication device. In some embodiments, the first firmware image provides one or more operating parameter configurations for the re-configurable data communication device. The apparatus also includes a controller, which is coupled to the storage and the re-configurable data communication device and operable to manage transport of data by the re-configurable data communication device, including obtaining the first firmware image from the storage and loading the first firmware image to the re-configurable data communication device. The apparatus additionally includes a housing at least partially supporting the storage and the controller.

20 Claims, 4 Drawing Sheets

_US 11,243,783 B2_

DEVICE RE-CONFIGURATION FOR SECURITY

TECHNICAL FIELD

This relates generally to the field of electronic device, and more specifically to an apparatus for re-configuring data communication components on electronic devices for security.

BACKGROUND

Native resources, e.g., memory, a processor, a sensor, a data communication device, etc., are central to the operation of electronic devices. In standard electronic device architectures, for performance consideration, a component is often granted direct access to the native resources. For example, Direct Memory Access (DMA) to an electronic device's memory is often given to high-speed USB and Wi-Fi chipsets. However, allowing direct access to the native resources may allow bypass of operating system supervision and/or security mechanisms, thus creating security vulnerabilities to be exploited by various forms of cyberattacks.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1C:
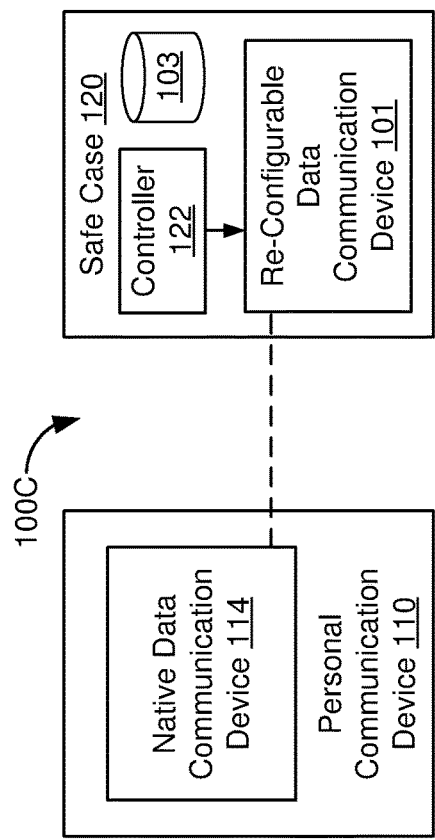
FIGS. 1A-1D are block diagrams of exemplary device re-configuration operating environment in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

In accordance with various embodiments, a safe case disclosed herein addresses the aforementioned security issues. In some embodiments, the safe case includes a controller that manages the control plane as well as the data plane of data communication. For data plane management, the controller monitors and manages the communication path for security and privacy protection. For control plane management, when relying on a re-configurable data communication device for data communication, the controller configures and/or re-configures operating parameters (e.g., passwords, keys, port access, data routing, etc.) of the re-configurable data communication device to bring the re-configurable data communication device to a trusted clean state. After applying a trusted firmware image, the re-configuration wipes out malicious codes that were injected into the re-configurable data communication device by an attacker, thus rendering such attacks non-permanent. Accordingly, the safe case disclosed herein improves security and user privacy protection relative to previously existing systems, devices, and methods.

In accordance with some embodiments, a method is performed at an apparatus including a controller and a storage. In some embodiments, the storage stores one or more firmware images, including a first firmware image that provides one or more operating parameter configurations for a re-configurable data communication device. In some embodiments, the storage also includes a non-transitory memory storing instructions for execution by the controller. The method includes obtaining at least one of operational characteristics of a personal communication device or current operating parameter configurations of the re-configurable data communication device; retrieving the first firmware image from the storage upon determining that at least one of the operational characteristics of the personal communication device or current operating parameter configurations of the re-configurable data communication device satisfies a re-configuration policy; and loading the first firmware image to the re-configurable data communication device in order to configure the re-configurable data communication device in accordance with the one or more operating parameter configurations provided by the first firmware image.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Figure 1D:
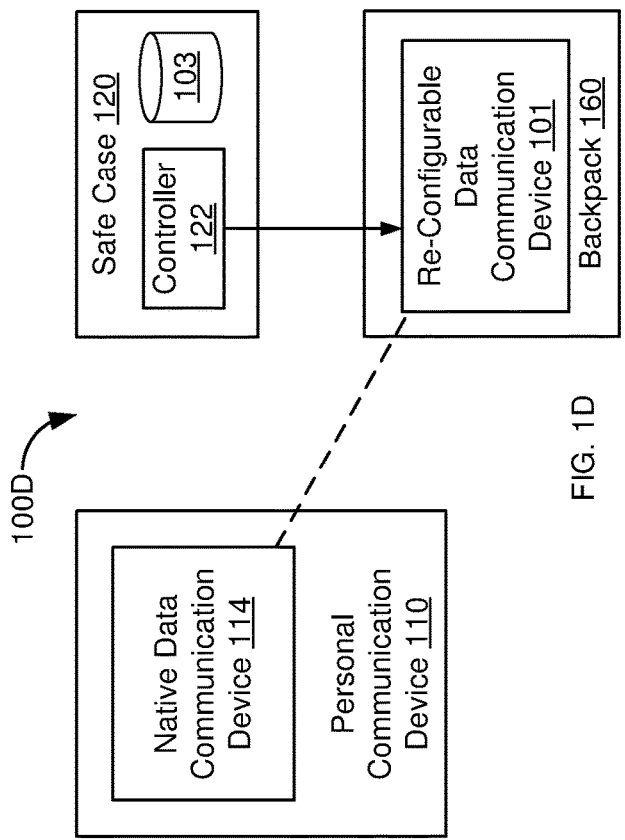
Figure 1A:
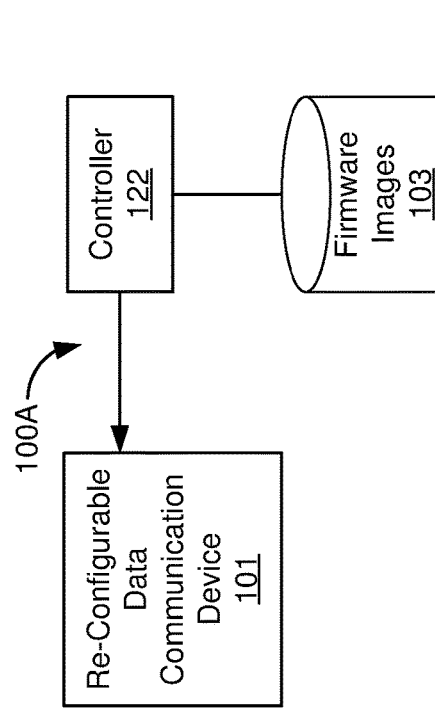

Referring to FIGS. 1A-1D, exemplary device re-configuration operating environment 100A-100D are illustrated, in accordance with some embodiments. In FIG. 1A, a controller 122 has access to a storage 103 storing one or more firmware images and a re-configurable data communication device 101. Each of the images includes information and/or a set of instructions for programming or configuring the re-configurable data communication device 101, e.g., setting SSID, password (or keys), port access, and/or data routing, etc.

For example, the re-configurable data communication device 101 can be a Wi-Fi chipset, a Bluetooth (BT)/Bluetooth Low Energy (BLE) chipset, a Near Field Communication (NFC) chipset, a Global Positioning System (GPS), a cellular communication chipset, a Universal Serial Bus (USB) chipset, a High Definition Multimedia Interface (HDMI) chipset, and/or a Lightning® (a registered trademark of Apple Inc. of Cupertino, Calif.) connection chipset. As will be described in detail below, the controller 122 manages the control plane of data communication associated with the re-configurable data communication device 101 by re-configuring the re-configurable data communication device 101. In some embodiments, the re-configuration is accomplished by obtaining a firm image from the storage 103 and applying the firmware image to the re-configurable data communication device 101. After applying the firmware image, the re-configurable data communication device 101 would have the configurations to operate in a trusted clean state, e.g., operating with operating parameters known to be safe for establishing data connections and/or exchanging data with an external device.

Figure 1B:
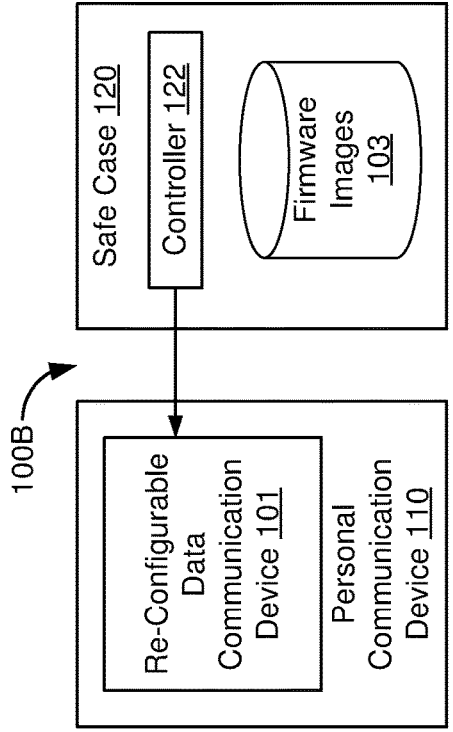

FIGS. 1B-1D illustrates various embodiments of a device re-configuration operating environment 100B-100D, in accordance with some embodiments. In FIG. 1B, a personal communication device 110 (also referred to hereinafter as personal communication device 110) includes the re-configurable data communication device 101 in accordance with some embodiments. In some embodiments, as will be shown and described below with reference to FIG. 2, for security and user privacy protection, a safe case 120 includes a housing that is arranged to hold the personal communication device 110. As used herein, the safe case 120 is also referred to as an active base, a smart case, an active case, or a case.

In some embodiments, the safe case 120 communicates with the personal communication device 110 through wired connection(s) or wirelessly. As such, a local communication channel is established between the personal communication device 110 and the safe case 120. In some embodiments, the firmware images stored in the storage 103 are located on the safe case 120, such that the controller 122 has access to the firmware images. When the re-configurable data communication device 101 affiliates with a Wi-Fi Access Point (AP), the settings on the re-configurable data communication device 101 may change. In order to restore the re-configurable data communication 101 to a trusted clean state, the controller 122 obtains a trusted firmware image from the storage 103, loads the trusted firmware image, and re-configures the re-configurable data communication device 101 via the local communication channel using the trusted firmware image.

In FIG. 1C, the personal communication device 110 includes a native data communication device 114, e.g., a Wi-Fi chipset, a BT/BLE chipset, an NFC chipset, a GPS, a cellular communication chipset, a USB chipset, an HDMI chipset, and/or a Lightning® (a registered trademark of Apple Inc. of Cupertino, Calif.) connection chipset. In some embodiments, instead of using the native data communication device 114, the safe case 120 includes the re-configurable data communication device 101 to communicate with an external device on behalf or supplementing the native data communication device 114, as indicated by the dotted line. As such, the re-configurable data communication device 101 on the safe case 120 is a non-native data communication device that provides alternative transport of data for the personal communication device 110 or serves as a proxy for the native data communication device 114. Accordingly, the re-configurable data communication device 101 is also referred to as a non-native data communication device, a non-native resource, or an alternative transport data communication device. In such embodiments, for the data plane management, the controller 122 manages the communication and/or coordination of communication by the re-configurable communication device 101. Further, for the control plane management, the controller 122 manages the configurations of the re-configurable data communication device 101.

For example, during initial configuration (e.g., factory installation) of the re-configurable data communication device 101, the controller 122 obtains a trusted firmware image from the storage 103 and installs the trusted firmware image on the re-configurable data communication device 101. In another example, the controller 122 can re-configure (also known as re-flash or re-program) the re-configurable data communication device 101 based on policy and/or context in order to re-store the re-configurable data communication device 101 to a trusted clean state.

In FIG. 1D, the safe case 120 is communicatively coupled to a supplemental functional device 160, which further includes the re-configurable data communication device 101 in accordance with some embodiments. Instead of using the native data communication device 114 for data communication, the re-configurable data communication device 101 on the supplemental functional device 160 communicates with an external device on behalf or supplementing the native data communication device 114, as indicated by the dotted line. In other words, the re-configurable data communication device 101 on the supplemental functional device 160 is a non-native data communication device that provides alternative transport of data for the personal communication device 110. In such embodiments, for data plane management, the controller 122 manages the communication and/or the communication path between the re-configurable communication device 101 and the personal communication device 110. Further, for control plane management, the controller 122 manages the configurations of the re-configurable data communication device 101, including the configuration and re-configuration of the re-configurable data communication device 101.

It should be noted that the controller 122 managed device re-configuration is not limited to the embodiments shown in FIGS. 1B-1D. Further, the controller 122 can re-configure more than one device. For example, the controller 122 can re-configure one or more of a first component on the personal communication device 110, a second component on the safe case 120, and/or a third component on the supplemental functional device 160. Accordingly, the controller 122 manages the configuration and/or re-configuration of more than one component in more than one electronic device in accordance with some embodiments. It should also be noted that the storage 103 for storing the firmware images is not limited to be on the safe case 120. In some embodiments, one or more of the firmware images are stored on an apparatus different from the safe case 120, e.g., on the personal communication device 110 and/or the backpack 160. In such embodiments, for security, the one or more firmware images are encrypted and/or signed prior to storage and the safe case 120 obtains the one or more firmware images from the storage, decrypts and/or verifies, before loading to the re-configurable data communication device 101 in accordance with some embodiments.

Figure 2:
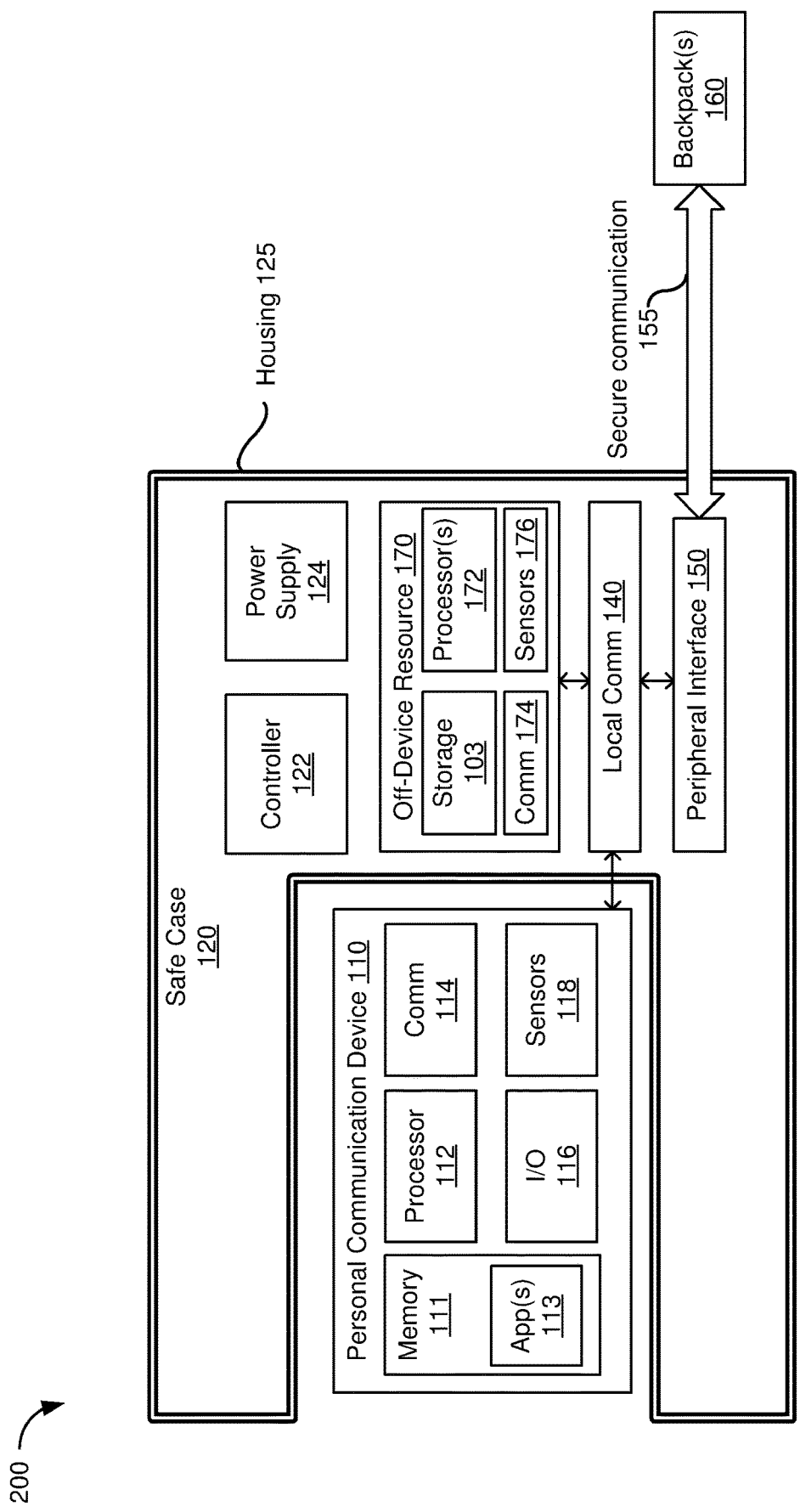
FIG. 2 is a block diagram illustrating exemplary devices and components in the device re-configuration operating environment in accordance with some embodiments.

Turning to FIG. 2, a simplified block diagram 200 illustrating the personal communication device 110, the safe case 120, and the backpack 160 used in the exemplary device re-configuration operating environment, in accordance with some embodiments. Different from a conventional base or case that merely provides structural support of another device, the safe base 120 actively monitors and analyzes the personal communication device 110 in order to determine whether the personal communication device 110 is a compromised device and takes appropriate actions to protect the personal communication device 110 against potential intrusion. As such, when the personal communication device 110 is held by the safe case 120, the safe case 120 enhances the security of the personal communication device 110.

In some embodiments, the safe case 120 includes a housing 125 arranged to hold the personal communication device 110 (e.g., a smartphone, a wearable, a tablet, etc.). In some embodiments, the housing 125 includes a plurality of moveable components mateable with another. In other words, the plurality of components, once mated with one another, form a housing assembly to hold the personal communication device 110. The housing assembly allows a user to insert the personal communication device 110 into the safe case 120 for more protection of work-related sensitive information (e.g., in a work mode) or take the personal communication device 110 out of the safe case 120 for less monitoring of the personal communication by enterprise (e.g., in a personal mode).

In some embodiments, the housing 125 includes one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially supports and holds the personal communication device 110, e.g., a partial enclosure as shown in FIG. 2 or a whole enclosure encapsulating the personal communication device 110. When in the first position, the housing 125, along with other components of the safe case 120, protects the personal communication device 110 against tracking or spying, e.g., by audio jamming, camera covering, and/or RF shielding, etc. When the one or more moveable components of the housing assembly are in a second position (e.g., hood slid up), a user can take the personal communication device 110 out of the housing 125 and place the personal communication device 110 in a non-protected mode.

In some embodiments, the personal communication device 110 held by the safe case 120 includes a processor 112, one or more communication devices 114, input/output devices 116, one or more sensors 118, and memory 111 for storing data as well as instructions associated with one or more applications 113 executed by the processor 112. In some embodiments, the input/output devices 116 include a display (including a touch screen display), a touch-sensitive surface, a keyboard (virtual or physical), a mouse, a pen, microphones, cameras, and/or speakers. In some embodiments, the one or more communication devices 114 connect the personal communication device 110 and another electronic device wirelessly (e.g., using wireless modem) or through a wired connection.

For example, the one or more communication devices 114 connect to the safe case 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to Long-Term Evolution (LTE), Wideband Code Division Multiple Access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the personal communication device 110 includes one or more sensors 118, including but not limited to biometric sensor(s), motion sensor(s), accelerometers, gyroscopes, and/or magnetometers (e.g., as part of an inertial measurement unit (IMU)) for obtaining information concerning the position (e.g., altitude) of the personal communication device 110. In some embodiments, the sensors 118 are coupled to the input/output devices 116, e.g., touch sensors and/or force sensors coupled to a touch sensitive surface, sound or acoustic sensors coupled to a microphone, or light sensors coupled to a camera. In some embodiments, the one or more sensors 118 are coupled to the one or more communication devices 114, so that the sensor data collected by the sensors 118 can be transmitted to another device (e.g., to the safe case 120 via a communication interface).

As used herein, the memory 111, the processor 112, the I/O devices 116, the communication component 114, and the sensors 118 are collectively referred to as native or on-device resource. In some embodiments, the safe case 120 includes at least one off-device resource 170 supported by the housing 125. The at least one off-device resource 170 provides an alternative (e.g., replacing or supplementing) to a corresponding on-device resource integrated within the personal communication device 110. As such, relative to the native resources or on-device resources as part of the personal communication device 110, the at least one off-device resource 170 is also referred to as non-native or alternative transport components. For example, the at least one off-device resource 170 can include one or more processors 172, storage 103 (including non-transitory memory), and/or communication component(s) 174 (e.g., cellular, GPS, Wi-Fi, LoRa, etc.). Though not shown FIG. 2, in some embodiments, the storage 103 includes a validation engine that validates the operational characteristics of the native resources on the personal communication device 110 as well as the operational parameter configurations of the off-device resources 170. The controller 122 uses the validation results generated by the validation engine to determine whether to re-configure the off-device resources 170.

In some embodiments, the controller 122 has physical access to the off-device resources 170. For example, the controller 122 has access to the storage 103 in order to obtain firmware images and/or policies stored in the storage 103. In another example, the controller 122 has access to the sensor data obtained by the sensors 176 in order to determine the context for applying re-configuration policies. In yet another example, the controller 122 has access to the communication components 174 for loading the firmware image (s) retrieved from the storage 103. In some embodiments, the access to the off-device resources 170 is through a non-DMA interface, e.g., a Secure Digital Input Output (SDIO) bus or an Inter-Integrated Circuit (I²C) bus, among others. In some embodiments, because the safe case 120 has other built-in security features (e.g., hardware root of trust, validation engine, continuous multifactor authentication, encryption, etc.), the access to the off-device resources 170 is through a DMA interface for improved performance In some embodiments, the at least one off-device resource 170 is re-configurable. In particular, when the at least one off-device resource 170 is associated with data communication, the at least one off-device resource 170 is also referred to as a re-configurable data communication device. In some embodiments, the at least one off-device resource 170 can replace or supplement on-device resources, such as the processor 112, the memory 111, and/or the communication device(s) 114 of the personal communication device 110.

For instance, the communication device 174 (e.g., cellular, Wi-Fi, LoRa, etc.), which is at least partially supported by the housing 125, is operable to serve as a proxy for the communication device 114 and provide a communication channel between the personal communication device 110 and a remote or external device (e.g., a device connected through a USB connector, a base station, an eNodeB, or a Wi-Fi access point (AP), etc.). In such embodiments, the controller 122 has physical access to the communication device 174, which is the re-configurable data communication device in accordance with some embodiments, and manages the re-configuration of the communication device 174 for security and privacy protection as shown in FIG. 1C and described above.

In some embodiments, the safe case 120 includes a peripheral interface 150 (e.g., a backpack interface) to connect to the supplemental functional device (e.g., the backpack 160). A supplemental functional device, as described herein, is a device connectable to the personal communication device 110 through the safe case 120 and provides supplemental functional functions to the personal communication device 110. In some embodiments, the supplemental functional device 160 is a modular and detachable device. In some embodiments, the supplemental functional device 160 snaps onto the back of the safe case 120 in order to be connected to the safe case 120 for added functionality.

The supplemental functional device 160 allows additional hardware and software functionality to be provided to a user of the personal communication device 110 and/or the safe case 120. As such, the supplemental functional device 160 supplements the functionality of the personal communication device 110 and/or the safe case 120. In some embodiments, the resources providing the supplemental functionality on the supplemental functional device 160 are also referred to as off-device resources. For instance, the supplemental functional device 160 can include sensors and/or processors for detecting odor, RF energy, biometric markers, etc. In another example, the supplemental functional device 160 can include a communication component for translating and relaying communication messages and acts as a proxy for the personal communication device 110 and/or the safe case 120. When components of the supplemental functional device 160 provide data communication functionality, the components are referred to as re-configurable data communication device, such as the embodiments shown in FIG. 1D and described above.

In some embodiments, the supplemental functional device 160 is connected to the safe case 120 through its peripheral interface, which is connectable to the peripheral interface 150 on the safe case 120. In some embodiments, the peripheral interface 150 connects the supplemental functional device 160 to the safe case 120 and the local communication device 140 further connects the peripheral interface 150 to the personal communication device 110. To enable the connection to the supplemental functional device 160, the housing 125 at least partially supports the peripheral interface 150.

For example, the peripheral interface 150 can include a number of connectors (e.g., contact pins or contact pads as indicated by the dots) connectable to the supplemental functional device 160. In some embodiments, the connectors are affixed to the housing 125 and at least partially supported by the housing 125. The connectors are mateable to the interface of the supplemental functional device 160. In some embodiments, the peripheral interface 150 is wholly supported by the housing 125, such that the peripheral interface 150 is integrated with or embedded in the housing 125 surface. In such embodiments, connectors from the supplemental functional device 160 can be plugged into the peripheral interface 150 in order to connect the supplemental functional device 160 to the safe case 120. In some embodiments, the peripheral interface 150 is operable to communicate with the supplemental functional device 160 via a physical channel established through the connectors. The physical channel forms a secure channel 155 for communication between the safe case 120 and the supplemental functional device 160. In some embodiments, through the secure channel 155, the controller 122 has access to the re-configurable data communication device and directs the re-configuration of the re-configurable data communication device for added security and privacy protection.

It should be noted that the peripheral interface 150 is not limited to physical connectors, in some embodiments, the peripheral interface 150 is a wireless interface. In some embodiments, the peripheral interface 150 includes a wireless modem operable to wirelessly communicate with the supplemental functional device 160. In some embodiments, the peripheral interface 150 leverages the wireless communication capability of the local communication device 140 to communicate with the supplemental functional device 160. For example, the safe case 120 can connect to a wireless communication enabled supplemental functional device 160 through a wireless peripheral interface 150 or through a wireless modem of the local communication device 140. As such, a wireless communication-enabled supplemental functional device 160 can communicate with the safe case 120 without being in contact with the housing 125 or physically connected to the peripheral interface 150. Further, it should be noted that at least some components of the supplemental functional device 160 can be integrated into the safe case 120 or vice versa. Accordingly, at least some supplemental functions provided by the supplemental functional device 160 can also be provided by the safe case 120.

Still referring to FIG. 2, in some embodiments, the safe case 120 includes a local communication device 140 coupled to the peripheral interface 150 and supported by the housing 125. In some embodiments, the local communication device 140 includes components, such as a personal communication device interface modem (e.g., a Wi-Fi modem, a BT/BLE radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface 150 and the personal communication device 110. In one direction, the communication channel carries information from the personal communication device 110 to the safe case 120. In the other direction, the communication channel (e.g., a secure communication channel 155) carries information from the supplemental functional device 160 via the peripheral interface 150 to the personal communication device 110 in order to supplement the functionality of the personal communication device 110.

In some embodiments, the at least one off-device 170 is coupled to the local communication device 140 (e.g., Wi-Fi, BT/BLE, infrared, NFC, a Lightning® (a registered trademark of Apple Inc., Cupertino, Calif.) connector, etc.). In some embodiments, the local communication device 140 includes a personal communication device interface modem (e.g., a Wi-Fi modem, BT/BLE radio, infrared radio, NFC radio, a Lightning® (a registered trademark of Apple Inc., Cupertino, Calif.) connector, etc.) operable to provide a communication channel (e.g., wirelessly or via physical connection) between the at least one off-device resource 140 and the personal communication device 110.

In some embodiments, the safe case 120 includes the controller 122 coupled to the peripheral interface 150, the at least one off-device resource 170, and/or the local communication device 140. Embodiments of the controller 122 include hardware, software, firmware, or a combination thereof. In some embodiments, the controller 122 is operable to manage the data plane and/or control plane of data communication associated with the safe case 120, the personal communication device 110, and the supplemental functional device 160.

For instance, the controller 122 is operable to manage the communication channel between the personal communication device 110 and the supplemental functional device 160 through the local communication device 140 and the peripheral interface 150. In other words, the controller 122 manages a segment of the communication channel between the personal communication device 110 and the safe case 120 through the management of the local communication device 140, and the controller 122 manages a segment of the communication channel between the safe case 120 and the supplemental functional device 160 through the management of the peripheral interface 150. In particular, with access to the native resources on the personal communication device 110 through the local communication channel, to the off-device resources 170, and/or components on the supplemental functional device 160, the controller 122 can re-configure the native resources (e.g., as shown in FIG. 1B), the off-device resources 170 (e.g., as shown in FIG. 1C), and/or the components on the supplemental functional device 160 (e.g., as shown in FIG. 1D) for security and protection in accordance with some embodiments.

In some embodiments, the safe case 120 includes a power supply 124. The power supply 124 supplies power to the peripheral interface 150, the local communication device 140, and the security management controller 122. In some embodiments, the power supply 124 includes at least one of a battery, a charging socket, a USB connector, a power plug, and/or a power socket. In some embodiments, the power supply 124 includes a connector for a battery.

It should be noted that embodiments of the components shown in FIG. 2 are not intended to be exhaustive or limiting. Many modifications and variations are possible in view of the above descriptions. For example, embodiments of the components include hardware, software, firmware, or a combination thereof. In another example, as shown in FIG. 3 and described below, one or more subcomponents or additional components can be part of the safe case 120.

Figure 3:
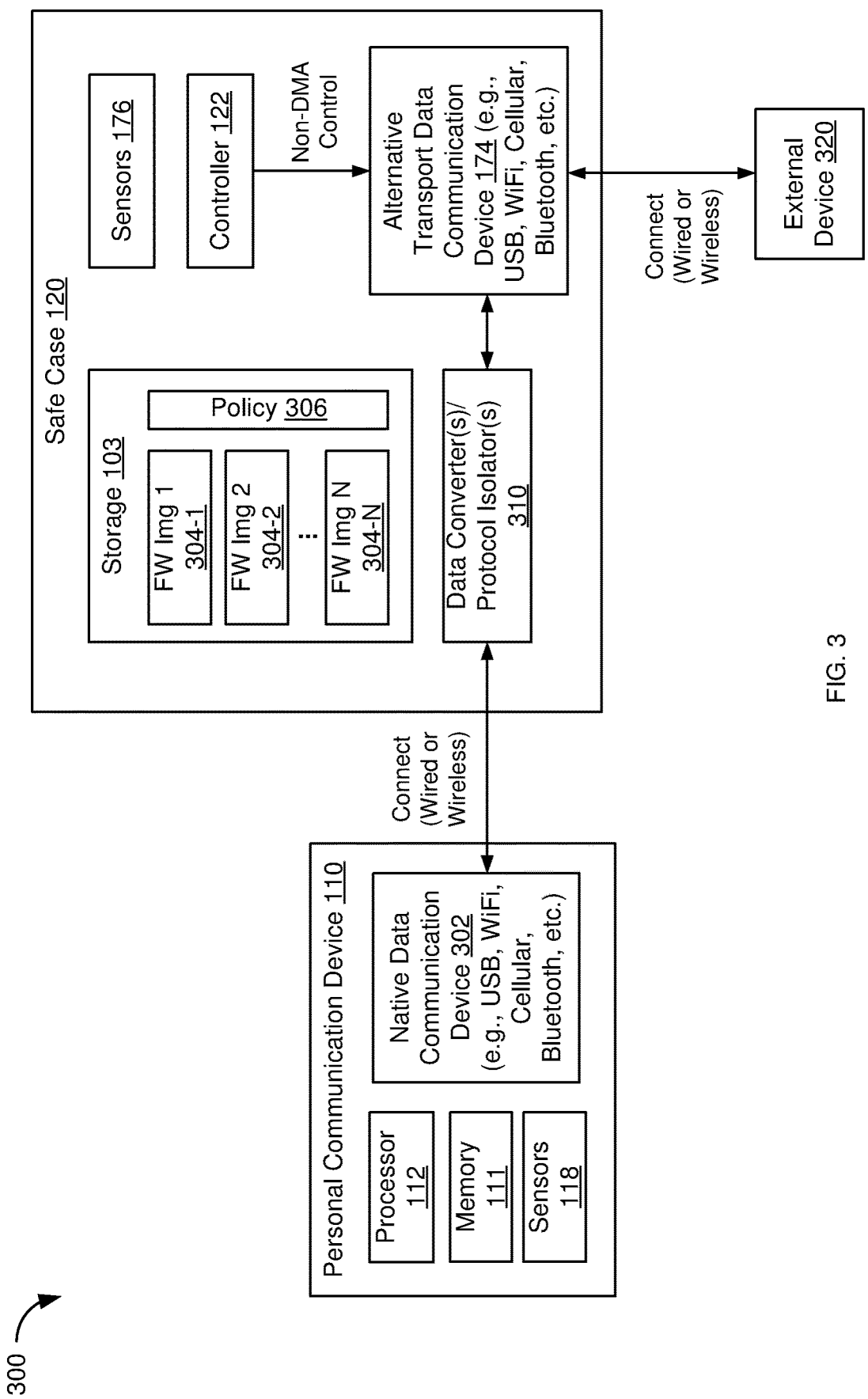
FIG. 3 is a block diagram illustrating an exemplary device re-configuration system in accordance with some embodiments.

FIG. 3 illustrates an exemplary device re-configuration system 300 for security and privacy protection in accordance with some embodiments. As explained above, the personal communication device 110 includes on-device resources, including one or more native data communication devices 302 (e.g., a USB device, a Wi-Fi device, a cellular device, or a Bluetooth device, etc.). Through a wired or wireless connection, e.g., the pairing or connection of the communication device 114 on the personal communication device 110 and the local communication device 140 at least partially supported by the housing (e.g., the housing 125, FIG. 2) of the safe case 120, a local communication channel is established.

Also as explained above, through the local communication channel, the controller 122 disables the native data communication device 302 (e.g., configuring the personal communication device 110 in an airplane mode) or places the native data communication device 302 in a low power mode to limit the range of RF energy transmission. For data communication, the alternative transport data communication device 174 transports data between the personal communication device 110 and an external device 320 (e.g., a Wi-Fi AP, a cellular base station, a Bluetooth device, a USB device, etc.) under the management of the controller 122.

Using the alternative transport data communication device 174 on the safe case 120 for data communication has several benefits. Unchecked access (e.g., DMA) to electronic devices' (e.g., the personal communication device's 110) memory or other native resources creates security vulnerabilities. In particular, native data communication devices 302 are susceptible to various forms of cyberattacks. For example, in order to establish a Wi-Fi connection to a Wi-Fi Access Point (AP) such as the external device 320, the affiliation of the Wi-Fi chipset on the personal communication device 110 to the AP often involves assigning, exchanging, and/or using secret keys and/or certificates. By removing the establishment of communication from the personal communication device 110 and managing it from the controller 122, the possibility that the compromised personal communication device 110 revealing the security information is reduced or eliminated.

Still referring to FIG. 3, as explained above, the safe case 120 includes the storage 103 that is at least partially supported by the housing (e.g., the housing 125, FIG. 2) of the safe case 120. The storage 103 stores one or more firmware images 304, e.g., a first firmware image 304-1, a second firmware image 304-2, ..., an Nth firmware image 304-N, etc. In some embodiments, the storage 103 also stores one or more policies 306. The controller 122 uses the one or more policies 306 for determining when to obtain a firmware image and which one of the one or more firmware images would be used for re-configuring or re-flashing the alternative transport data communication device 174.

In some embodiments, the storage 103 or a portion of the storage 103 for storing the one or more firmware images 304 is secure, e.g., not allowing DMA, encrypted, cannot be modified or removed from the safe case 120, etc. The one or more firmware images 304 include information or a set of instructions for programming/configuring the alternative transport data communication device 174, e.g., setting SSID, password (or keys), port access, and/or data routing of the alternative transport data communication device 174. In some embodiments, other components in the safe case 120 includes information for programming/configuring the alternative transport data communication device 174. In such embodiments, the one or more firmware images 304 include metadata to point to instructions or codes for how to program or configure the alternative transport data communication device 174, to point to commands to set SSID, keys, and/or password, or to point to values to set for configuration variables.

In some embodiments, the one or more firmware images 304 are trusted and/or clean. In other words, once the alternative transport data communication device 174 is configured according to the one or more firmware images 304, the alternative transport data communication device 174 operates in a trusted clean state. For example, upon loading a trusted firmware image, installing it, programming, and/or configuring the alternative transport data communication device 174 according to the trusted firmware image, potential malicious codes previously injected into the alternative transport data communication device 174 are wiped out, so that the alternative transport data communication device 174 would not reveal private information obtained from the personal communication device 110 and/or the safe case 120.

In some embodiments, the controller 122 loads the firmware image 304 retrieved from the storage 103 to the alternative transport data communication device 174 via a non-DMA control line, e.g., a SDIO bus or an I²C bus. In some embodiments, upon taking security precautions, the controller 122 re-programs or re-configures the alternative transport data communication device 174 via a DMA channel for improved performance For example, when the second firmware image 304-2 is different from the first firmware image 304-1, the controller 122 selects an image between the first firmware image 304-1 and the second firmware image 304-2 based on the one or more policies 306 and/or sensor data as the context (e.g., data from the sensors 118 on the personal communication device 110 and/or the sensors 176 on the safe case 120). Once selected, the controller 122 loads the selected image to the alternative transport data communication device 174, e.g., via a non-DMA control line as shown in FIG. 3. Accordingly, at least a portion of a firmware image on the alternative transport data communication device 174 is replaced or overwritten by the selected image or at least a subset of the operating parameters on the alternative transport data communication device 174 is overwritten pursuant to data or metadata associated with the selected image. As a result, the controller 122 re-configures or re-programs the alternative transport data communication device 174 according to the selected image.

In some embodiments, the controller 122 determines when to load the firmware image 304 and which one of the firmware images 304 to load based on the policies 306. For instance, one policy 306 specifies re-configuration of the alternative transport data communication device 174 using a firmware image 304 representing an initial or factory configuration of the alternative transport data communication device 174. Based on such policy 306, the controller 122 selects the firmware image 304 specified in the policy 306 and loads the selected firmware image 304 on the alternative transport data communication device 174 upon detecting a request of utilizing the alternative transport data communication device 174 for communication. As such, the initial state is restored on the alternative transport data communication device 174 before using the alternative transport data communication device 174 for communication. In another example, based on a policy specifying periodic re-flashing of the alternative transport data communication device 174 using a firmware image 304 for periodic re-flashing, the controller 122 periodically loads the firmware image 304 for periodic re-flashing and re-configures the alternative transport data communication device 174 periodically using the designated firmware image 304.

In some embodiments, the controller 122 determines when to load the firmware image 304 and which one of the firmware images 304 to load based on context. In some embodiments, the context includes time, location, an authentication or trust score of the user, biometric data, etc. For example, based on the sensor data collected by the sensors 118 and/or the sensors 176, when the safe case 120 enters and/or exits a geographic area (e.g., a facility, a building, or a property), connects and/or disconnects from a Wi-Fi AP (e.g., re-flashing every time before connecting or after disconnecting in case the Wi-Fi AP is a malicious AP), at a random time, etc. By switching the firmware images 304, the safe case 120 makes it more difficult to guess the configurations of the alternative transport data communication device 174. Further, re-loading and re-configuring the alternative transport data communication device 174 wipes out malicious code that is injected into the alternative transport data communication device 174, thus rendering such attacks non-permanent. As a result, the policies 306 in conjunction with the context dictate the malicious code life time.

In some embodiments, the local communication channel includes one or more data converters 310 for additional security and privacy protection. As explained above with reference to FIG. 2, the controller 122 manages both the data plane and the control plane of the communication path between the personal communication device 110 and the external device 320. For the data plane management, the controller 122 manages the local communication channel between the personal communication device 110 and the alternative transport data communication device 174 and the remote communication channel between the alternative transport data communication device 174 and the external device 320. For the control plane management, the one or more data converters 310 under the management of the controller 122 provide one or more barriers for an attacker to cross.

For instance, in case the alternative transport data communication device 174 includes a Wi-Fi chipset, adding an Ethernet and/or a USB driver as the data converter(s) 310 provides one or more protocol breaks. When malicious codes attempt to control the alternative transport data communication device 174 according to the Wi-Fi protocol, because Ethernet and/or USB are different protocols from the Wi-Fi protocol, the malicious codes exploiting the Wi-Fi protocol would not be able to gain direct control to the alternative transport data communication device 174.

Figure 4:
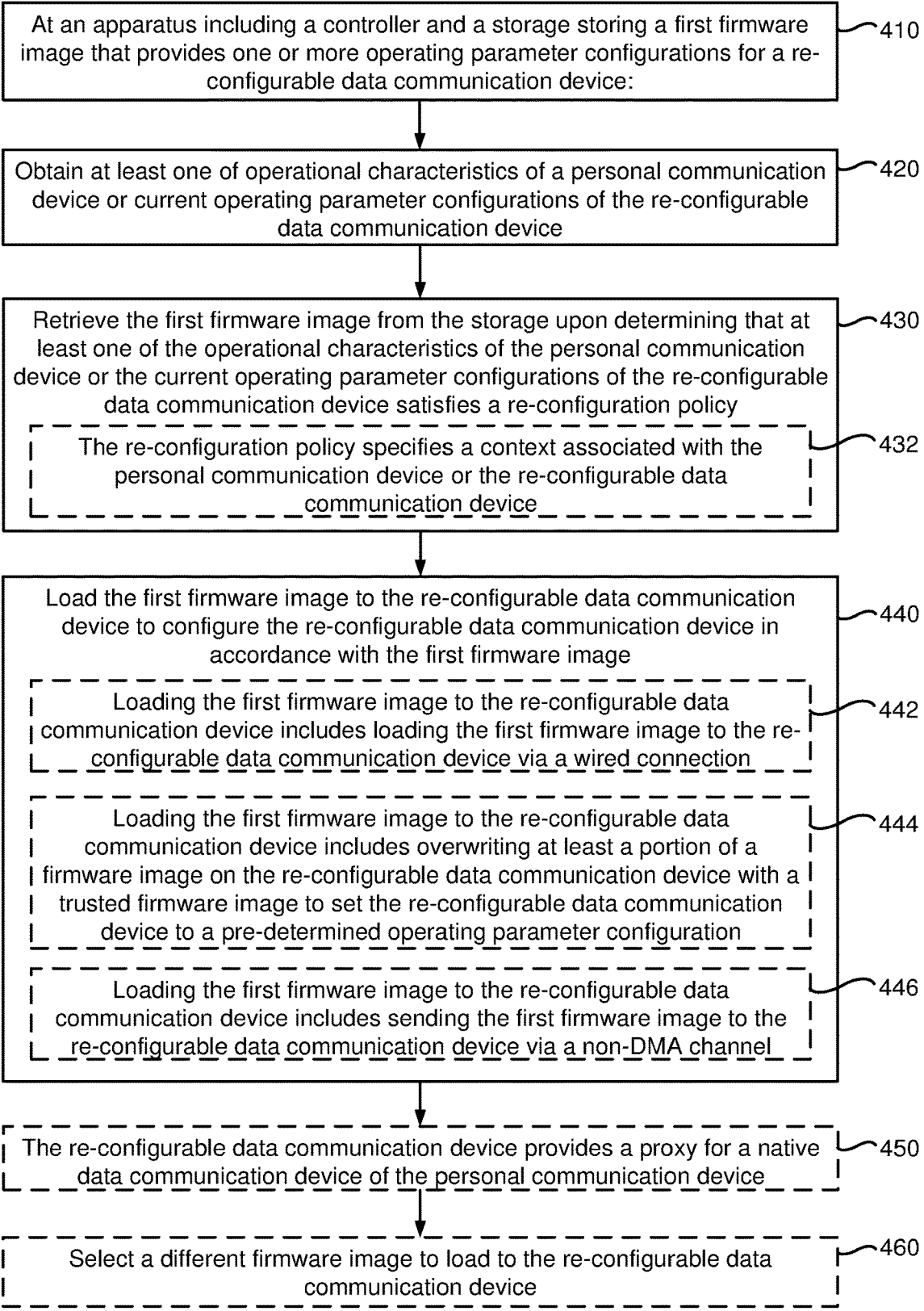
FIG. 4 is a flowchart illustrating a method of device re-configuration for security in accordance with some embodiments.

FIG. 4 is a flowchart representation of a device re-configuration method 400, in accordance with some embodiments. In some embodiments, as represented by block 410, the device re-configuration method 400 is performed at an apparatus (e.g., the safe case 120, FIGS. 1B-1D and 2-3) including a controller (e.g., the controller 122, FIGS. 1A-1D and 2-3) and a storage (e.g., the storage 103, FIGS. 1A-1D and 2-3). In some embodiments, the storage stores one or more firmware images (e.g., the firmware image(s) 304, FIG. 3), including a first firmware image that provides one or more operating parameter configurations for a re-configurable data communication device. In some embodiments, the storage also includes a non-transitory memory storing instructions for execution by the controller. Briefly, the method 400 includes obtaining at least one of operational characteristics of a personal communication device or current operating parameter configurations of the re-configurable data communication device; retrieving the first firmware image from the storage upon determining that at least one of the operational characteristics of the personal communication device or current operating parameter configurations of the re-configurable data communication device satisfies a re-configuration policy; and loading the first firmware image to the re-configurable data communication device in order to configure the re-configurable data communication device in accordance with the one or more operating parameter configurations provided by the first firmware image.

To that end, as represented by block 420, the method 400 includes obtaining at least one of operational characteristics of a personal communication device or current operating parameter configurations of the re-configurable data communication device. For example, in FIGS. 2 and 3, the controller 122 obtains sensor data from the sensors 118 or the operational status of the processor 112, the applications 113, the input/output devices 116, and/or the communication devices 114. In another example, in FIG. 2, the controller 122 obtains the current operating parameter configurations of the off-device resource 170.

In some embodiments, the controller 122 further determines context based on the operational characteristics of the personal communication device 110 and/or current operating parameter configurations of the re-configurable data communication device. For example, in FIG. 2, the controller 122 obtains and monitors the location of the personal communication device 110 and/or the safe case 120 based on GPS data obtained by the GPS sensor on the personal communication device 110 and/or the safe case 120. In another example, in FIG. 2, the controller 122 obtains signatures of applications 113 being executed by the processor 112 in order to determine whether the applications 113 are safe to execute (e.g., on a whitelist) or malicious (e.g., on a blacklist). In yet another example, in FIG. 3, the controller 122 monitors activities on the alternative transport data communication device 174, after establishing a connection with the external device 320 in order to determine whether the external device 320 (e.g., a Wi-Fi AP) has modified the operating parameter configurations (e.g., keys, passwords, certificates, etc.) of the alternative transport data communication device 174.

As represented by block 430, the method 400 further includes retrieving the first firmware image from the storage upon determining that at least one of the operational characteristics of the personal communication device or the current operating parameter configurations of the re-configurable data communication device satisfies a re-configuration policy. In some embodiments, as represented by block 432, the re-configuration policy specifies a context associated with the personal communication device or the re-configurable data communication device. For example, the re-configuration policy may specify whether to re-configure the re-configurable data communication device based on time (e.g., periodically, at random time, a specified time, etc.), location (e.g., geo-fencing), connection status (e.g., before or after establishing or ending communication), and/or whether a trust score or a biometric trait falls below a pre-determined threshold, etc. In some embodiments, the re-configuration policy specifies one or more validation engine results would retrieval of the first firmware image to start the re-configuration process.

Still referring to FIG. 4, as represented by block 440, the method 400 further includes loading the first firmware image to the re-configurable data communication device to configure the re-configurable data communication device in accordance with the first firmware image. In some embodiments, as represented by block 442, loading the first firmware image to the re-configurable data communication device includes loading the first firmware image to the re-configurable data communication device via a wired connection. For example, in FIGS. 1B-1D, the connection between the controller 122 and the re-configurable data communication device 101 is a wired connection.

In some embodiments, as represented by block 444, the first firmware image is a trusted firmware image. In such embodiments, loading the firmware image to the re-configurable data communication device includes overwriting at least a portion of a firmware image on the re-configurable data communication device with the trusted firmware image to set the re-configurable data communication device to a pre-determined operating parameter configuration. For example, in FIG. 3, the one or more firmware images 304 include information or a set of instructions for programming/configuring the alternative transport data communication device 174, e.g., setting SSID, password (or keys), port access, and/or data routing of the alternative transport data communication device 174. The one or more firmware images 304 are one or more trusted firmware images, so that once loaded and overwritten at least a portion of the current firmware image on the alternative transport data communication device 174, the alternative transport data communication device 174 configured according to the one or more trusted firmware images would be cleared of malicious codes and/or operating parameter configurations set by the malicious codes.

In some embodiments, as represented by block 446, loading the first firmware image to the re-configurable data communication device includes sending the first firmware image to the re-configurable data communication device via a non-DMA channel, e.g., a SDIO bus or an I²C bus.

In some embodiments, as represented by block 450, the method 400 further includes establishing a local communication channel with the personal communication device; directing, via the local communication channel, the personal communication device to disable a native data communication device of the personal communication device; and communicating data exchanged with an external device to the personal communication device to provide a proxy for the native data communication device. In some embodiments, the local communication channel is through a wired connection or wireless.

In some embodiments, the storage further stores a second firmware image different from the first firmware image. In such embodiments, as represented by block 460, the method 400 further includes selecting an image between the first firmware image and the second firmware image based on a policy; and loading the selected image to the re-configurable data communication device to configure the re-configurable data communication device in accordance with the selected image.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a storage storing a first firmware image for a re-configurable data communication device, wherein the first firmware image provides one or more operating parameter configurations for the re-configurable data communication device;
   a controller, coupled to the storage and the re-configurable data communication device, operable to manage transport of data by the re-configurable data communication device, including:
      obtaining the first firmware image from the storage; and
      loading the first firmware image to the re-configurable data communication device; and
   a housing at least partially supporting the storage and the controller, wherein the housing is arranged to hold a personal communication device, including a native data communication device, and the housing at least partially supports the re-configurable data communication device, and the re-configurable data communication device is operable as a proxy for the native data communication device of the personal communication device.

2. The apparatus of claim 1, wherein:
   the housing is arranged to hold a personal communication device, wherein the re-configurable data communication device is included in the personal communication device; and
   the controller is connected to the re-configurable data communication device through a physical connection.

3. The apparatus of claim 1, further comprising a peripheral interface supported by the housing, wherein:
   the peripheral interface is connectable to a supplemental functional device and coupled to the controller; and
   the re-configurable data communication device is included in the supplemental functional device and supplements at least one of a personal communication device held by the housing or the apparatus.

4. The apparatus of claim 1, wherein:
   the first firmware image is a trusted firmware image; and
   loading the firmware image to the re-configurable data communication device includes at least one of overwriting at least a portion of a firmware image on the re-configurable data communication device with the trusted firmware image or overwriting at least a subset of operating parameters on the reconfigurable data communication device to set the re-configurable data communication device to a pre-determined operating parameter configuration.

5. The apparatus of claim 1, wherein the storage further stores a second firmware image different from the first firmware image, and the controller is further operable to select an image between the first firmware image and the second firmware image based on a policy and load the selected image to the re-configurable data communication device.

6. The apparatus of claim 1, wherein the controller is coupled to the re-configurable data communication device via a non-Direct Memory Access (DMA) channel.

7. The apparatus of claim 1, wherein obtaining the first firmware image and loading the first firmware image are performed based on a re-configuration policy.

8. The apparatus of claim 1, wherein obtaining the firmware image and loading the firmware image are performed in accordance with a determination by the controller that based on a context, the re-configurable data communication device is operating in an unsafe state.

9. The apparatus of claim 1, further comprising a first communication device, at least partially supported by the housing, connectable to a second communication device of the personal communication device in order to establish a local communication channel.

10. The apparatus of claim 9, wherein the controller is further operable to, via the local communication channel, disable the native data communication device of the personal communication device.

11. The apparatus of claim 9, wherein the local communication channel is through a wired connection at least partially supported by the housing or a wireless connection establishing by pairing the first communication device and the second communication device.

12. The apparatus of claim 1, wherein the controller is further operable to configure the re-configurable data communication device as the proxy for the native data communication device of the personal communication device, including:
selecting the re-configurable data communication device to provide alternative transport of the data for the personal communication device.

13. A method comprising:
at an apparatus including a controller and a storage storing a first firmware image that provides one or more operating parameter configurations for a re-configurable data communication device:
obtaining at least one of operational characteristics of a personal communication device or current operating parameter configurations of the re-configurable data communication device;
retrieving the first firmware image from the storage upon determining that at least one of the operational characteristics of the personal communication device or the current operating parameter configurations of the re-configurable data communication device satisfies a re-configuration policy;
loading the first firmware image to the re-configurable data communication device in order to configure the re-configurable data communication device in accordance with the one or more operating parameter configurations provided by the first firmware image;
establishing a local communication channel with the personal communication device;
directing, via the local communication channel, the personal communication device to disable a native data communication device of the personal communication device; and
communicating data exchanged with an external device to the personal communication device to provide a proxy for the native data communication device.

14. The method of claim 13, wherein the re-configuration policy specifies a context associated with the personal communication device or the re-configurable data communication device.

15. The method of claim 13, wherein loading the first firmware image to the re-configurable data communication device includes loading the first firmware image to the re-configurable data communication device via a wired connection.

16. The method of claim 13, wherein:
the first firmware image is a trusted firmware image; and
loading the firmware image to the re-configurable data communication device includes overwriting at least a portion of a firmware image on the re-configurable data communication device with the trusted firmware image to set the re-configurable data communication device to a pre-determined operating parameter configuration.

17. The method of claim 13, wherein loading the first firmware image to the re-configurable data communication device includes sending the first firmware image to the re-configurable data communication device via a non-DMA channel.

18. The method of claim 13, wherein the local communication channel is through a wired connection or a wireless connection.

19. The method of claim 13, wherein the storage further stores a second firmware image different from the first firmware image, and the method further includes:
selecting an image between the first firmware image and the second firmware image based on a policy; and
loading the selected image to the re-configurable data communication device to configure the re-configurable data communication device in accordance with the selected image.

20. The apparatus of claim 13, wherein communicating the data exchanged with the external device to the personal communication device to provide the proxy for the native data communication device includes:
selecting the re-configurable data communication device to provide alternative transport of the data for the personal communication device.

* * * * *